United States Patent
Qu et al.

(10) Patent No.: US 11,502,986 B2
(45) Date of Patent: Nov. 15, 2022

(54) REDUCING TRANSMISSION DELAY OF TRANSMITTING DATA IN WI-FI

(71) Applicant: Huawei Technologies Co., Ltd., Shenzhen (CN)

(72) Inventors: Xiaoyang Qu, Nanjing (CN); Jian Chen, Nanjing (CN); Zhigang Huang, Grenoble (FR); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 17/139,204

(22) Filed: Dec. 31, 2020

(65) Prior Publication Data

US 2021/0126900 A1    Apr. 29, 2021

Related U.S. Application Data

(63) Continuation of application No. PCT/CN2019/094328, filed on Jul. 2, 2019.

(30) Foreign Application Priority Data

Jul. 3, 2018    (CN) .................... 201810733667.0

(51) Int. Cl.
| | | |
|---|---|---|
| *H04L 1/08* | (2006.01) | |
| *H04L 61/2592* | (2022.01) | |
| *H04W 72/04* | (2009.01) | |
| *H04L 61/5007* | (2022.01) | |
| *H04W 80/02* | (2009.01) | |
| *H04W 84/12* | (2009.01) | |

(52) U.S. Cl.
CPC ............ *H04L 61/2592* (2013.01); *H04L 1/08* (2013.01); *H04L 61/5007* (2022.05); *H04W 72/04* (2013.01); *H04W 80/02* (2013.01); *H04W 84/12* (2013.01)

(58) Field of Classification Search
CPC ... H04L 61/2592; H04L 61/2007; H04L 1/08; H04W 72/04; H04W 80/02; H04W 84/12
See application file for complete search history.

(56) References Cited

U.S. PATENT DOCUMENTS

| | | | |
|---|---|---|---|
| 8,284,753 B2 | 10/2012 | Nishibayashi et al. | |
| 8,311,029 B2 | 11/2012 | Chang et al. | |
| 8,351,365 B2 | 1/2013 | Seok | |
| 8,995,326 B2 | 3/2015 | Gong et al. | |

(Continued)

FOREIGN PATENT DOCUMENTS

| | | |
|---|---|---|
| CN | 101480070 A | 7/2009 |
| CN | 101651963 A | 2/2010 |

(Continued)

*Primary Examiner* — Kent Krueger
(74) *Attorney, Agent, or Firm* — Slater Matsil, LLP (57) ABSTRACT

A data sending method, a sending device, a data receiving method, and a receiving device, the method including obtaining, by a sending device, a target medium access control protocol data unit (MPDU) by performing encapsulation processing on an internet protocol (IP) data packet of a specified service, where the sending device and a receiving device are connected through Wi-Fi, generating a backup MPDU of the target MPDU, and sending the target MPDU and the backup MPDU to the receiving device.

20 Claims, 6 Drawing Sheets

(56) References Cited

U.S. PATENT DOCUMENTS

| | | | |
|---|---|---|---|
| 9,065,652 B2 | 6/2015 | Chang et al. | |
| 10,009,736 B1* | 6/2018 | Chu | H04W 12/03 |
| 10,511,991 B2 | 12/2019 | Ma et al. | |
| 10,597,056 B2 | 3/2020 | Aoyama et al. | |
| 2009/0207771 A1 | 8/2009 | Lindskog et al. | |
| 2009/0285192 A1 | 11/2009 | Shiba et al. | |
| 2009/0290524 A1* | 11/2009 | Seok | H04L 1/1829 |
| | | | 714/E11.131 |
| 2010/0054189 A1 | 3/2010 | Chang et al. | |
| 2011/0264977 A1* | 10/2011 | Chen | H04L 1/1854 |
| | | | 714/749 |
| 2014/0079016 A1 | 3/2014 | Dai et al. | |
| 2014/0161032 A1* | 6/2014 | Chen | H04W 40/12 |
| | | | 370/328 |
| 2016/0380727 A1* | 12/2016 | Ryu | H04L 1/18 |
| | | | 370/245 |
| 2017/0063509 A1* | 3/2017 | Kim | H04L 1/1685 |
| 2018/0007561 A1* | 1/2018 | Adachi | H04W 74/002 |
| 2018/0007701 A1* | 1/2018 | Adachi | H04B 1/16 |
| 2018/0310202 A1* | 10/2018 | Löhr | H04W 36/0066 |
| 2019/0268818 A1* | 8/2019 | Yi | H04W 80/08 |
| 2020/0322256 A1* | 10/2020 | Tang | H04W 28/04 |
| 2021/0195444 A1* | 6/2021 | Teyeb | H04W 76/15 |

FOREIGN PATENT DOCUMENTS

| | | |
|---|---|---|
| CN | 101897139 A | 11/2010 |
| CN | 102144369 A | 8/2011 |
| CN | 106470497 A | 3/2017 |
| CN | 106657918 A | 5/2017 |
| CN | 107104769 A | 8/2017 |
| JP | 2012502542 A | 1/2012 |
| JP | 2012529849 A | 11/2012 |
| JP | 2005341441 A | 12/2015 |
| JP | 2017537498 A | 12/2017 |
| WO | 2009048296 A2 | 4/2009 |
| WO | 2016129086 A1 | 8/2016 |
| WO | 2017217766 A1 | 12/2017 |

* cited by examiner

REDUCING TRANSMISSION DELAY OF TRANSMITTING DATA IN WI-FI

CROSS-REFERENCE TO RELATED APPLICATIONS

This application is a continuation of International Application No. PCT/CN2019/094328, filed on Jul. 2, 2019, which claims priority to Chinese Patent Application No. 201810733667.0, filed on Jul. 3, 2018. The disclosures of the aforementioned applications are hereby incorporated by reference in their entireties.

TECHNICAL FIELD

The present invention relates to the field of data transmission technologies, and in particular, to a data sending method, a sending device, a data receiving method, and a receiving device.

BACKGROUND

Wireless fidelity (Wi-Fi) is currently a most common user network access technology, and is widely applied in a plurality of scenarios such as home, community, and office. A Wi-Fi signal at a receive end may be relatively weak due to factors such as co-channel/adjacent-frequency interference and building blocking, and consequently, there is usually an area or a time period in which a signal-to-noise ratio of the Wi-Fi signal is relatively low. In such a case of a relatively weak signal and relatively strong interference, a large quantity of packets are easily lost when data is transmitted through Wi-Fi. To ensure that no packet is lost, a lost packet needs to be retransmitted.

It may be understood that, in the case of a relatively weak signal and relatively strong interference, a transmission delay that exists when the data is transmitted through Wi-Fi is originally relatively large. In addition, after a packet is lost, when the lost packet is retransmitted, the originally relatively large transmission delay is increased by several times due to retransmission, and consequently, the transmission delay of the data in a Wi-Fi phase is significantly increased.

SUMMARY

A technical problem to be resolved in this application is how to reduce a transmission delay of transmitting data in a Wi-Fi phase.

According to a first aspect, this application provides a data sending method, and the data sending method includes obtaining a target medium access control protocol data unit (MPDU), where the target MPDU is obtained by performing encapsulation processing on an internet protocol (IP) data packet of a specified service, and a sending device and a receiving device are connected through Wi-Fi, generating a backup MPDU of the target MPDU, and sending the target MPDU and the backup MPDU to the receiving device.

It can be learned that in this embodiment of this application, the sending device generates the backup MPDU of the target MPDU, and sends both the target MPDU and the backup MPDU to the receiving device, so that a probability of retransmitting the target MPDU can be greatly reduced, to reduce a transmission delay of the target MPDU in the Wi-Fi phase.

In an optional implementation, the obtaining a target medium access control protocol data unit (MPDU) includes obtaining a to-be-sent MPDU, where the to-be-sent MPDU is obtained by performing encapsulation processing on a medium access control service data unit MSDU, and if the to-be-sent MPDU includes a target MSDU, identifying the to-be-sent MPDU as the target MPDU, where the target MSDU is the IP data packet of the specified service, or the target MSDU is obtained by performing encapsulation processing on the IP data packet of the specified service.

In an optional implementation, the IP data packet of the specified service is identified after a source IP address of the IP data packet of the specified service is matched against a preset IP address set.

In an optional implementation, before the generating a backup MPDU of the target MPDU, the method further includes obtaining a retransmission rate between the sending device and the receiving device, and if the retransmission rate is greater than a preset retransmission threshold, triggering execution of the generating a backup MPDU of the target MPDU.

In an optional implementation, the retransmission rate is determined based on a quantity of retransmitted MPDUs sent to the receiving device in a unit time and a total quantity of MPDUs sent to the receiving device in the unit time that are obtained through statistics collection.

MPDUs sent by the sending device to the receiving device may include an MPDU of the specified service and an MPDU of an unspecified service. In an optional implementation, the retransmission rate is determined based on a quantity of retransmitted MPDUs of the unspecified service that are sent to the receiving device in a unit time and a total quantity of MPDUs of the unspecified service that are sent to the receiving device in the unit time that are obtained through statistics collection.

In an optional implementation, the determining a quantity of backups based on the retransmission rate and the retransmission threshold includes determining N based on the retransmission rate and the retransmission threshold, where N is a positive integer greater than 1, and determining the quantity of backups based on N, where N meets a condition that the retransmission rate raised to the power of N−1 is greater than the retransmission threshold, and the retransmission rate raised to the power of N is less than the retransmission threshold.

In an optional implementation, the determining a quantity of backups based on the retransmission rate and the retransmission threshold includes determining N based on the retransmission rate and the retransmission threshold, where N is a positive integer greater than 1, and determining the quantity of backups based on N, where N meets a condition that the retransmission rate raised to the power of N−1 is greater than the retransmission threshold, and the retransmission rate raised to the power of N is less than the retransmission threshold.

In an optional implementation, the determining the quantity of backups based on N includes determining N−1 as the quantity of backups.

In an optional implementation, the sending the target MPDU and the backup MPDU to the receiving device includes separately sending the target MPDU and the backup MPDU to the receiving device.

In another optional implementation, the sending the target MPDU and the backup MPDU to the receiving device includes performing aggregation processing on the target MPDU and the backup MPDU, and sending, to the receiving device, the target MPDU and the backup MPDU that are aggregated.

A sequence number may be set for the to-be-sent MPDU obtained after encapsulation processing, and the target MPDU and the backup MPDU of the target MPDU have a same sequence number.

In an optional implementation, the aggregation processing includes separately performing aggregation processing on the target MPDU and the backup MPDU sequentially based on the sequence number.

In another optional implementation, the aggregation processing includes performing aggregation processing on the target MPDU and the backup MPDU sequentially based on the sequence number.

It can be learned that, by implementing the foregoing optional implementations, a single retransmission rate of the target MPDU may be reduced to at least the preset retransmission threshold, to greatly reduce a transmission delay of the target MPDU in the Wi-Fi phase.

According to a second aspect, this application provides a data receiving method, and the data receiving method includes receiving to-be-processed data, where the to-be-processed data includes a medium access control protocol data unit (MPDU), and a sequence number is set for the MPDU, and performing screening processing on the MPDU, where the screening processing includes performing deduplication processing on the MPDU based on the sequence number.

It can be learned that in this embodiment of this application, screening processing is performed on a received MPDU, so that a receive end can be prevented from repeatedly storing same data, to save storage space.

According to a third aspect, this application provides a sending device. The sending device has a function of implementing the first aspect or the possible implementations of the first aspect. The function may be implemented by hardware, or may be implemented by hardware executing corresponding software. The hardware or the software includes one or more modules, units, or subunits corresponding to the foregoing function. The module, the unit, or the subunit may be software and/or hardware. Based on a same inventive concept, for a problem-resolving principle and beneficial effects of the sending device, refer to the method in the first aspect, the possible method implementations of the first aspect, and the brought beneficial effects. Therefore, for implementation of the sending device, refer to the method in the first aspect and the possible method implementations of the first aspect. No repeated description is provided.

According to a fourth aspect, this application provides a receiving device. The receiving device has a function of implementing the second aspect. The function may be implemented by hardware, or may be implemented by hardware executing corresponding software. The hardware or the software includes one or more modules corresponding to the foregoing function. The module may be software and/or hardware. Based on a same inventive concept, for a problem-resolving principle and beneficial effects of the receiving device, refer to the method in the second aspect and the brought beneficial effects. Therefore, for implementation of the receiving device, refer to the method in the second aspect. No repeated description is provided.

According to a fifth aspect, this application provides a sending device. The sending device includes a memory, configured to store one or more programs, and a processor, configured to invoke the program stored in the memory, to implement the solution in the method design of the first aspect. For a problem-resolving implementation and beneficial effects of the sending device, refer to the method in the first aspect, the possible method implementations of the first aspect, and the brought beneficial effects. No repeated description is provided.

According to a sixth aspect, this application provides a receiving device. The receiving device includes a memory, configured to store one or more programs, and a processor, configured to invoke the program stored in the memory, to implement the solution in the method design of the second aspect. For a problem-resolving implementation and beneficial effects of the receiving device, refer to the method in the second aspect and the brought beneficial effects. No repeated description is provided.

According to a seventh aspect, a computer-readable storage medium is provided. The computer storage medium stores a computer program, the computer program includes a program instruction, and when the program instruction is executed by a processor, the processor is enabled to perform the method in the first aspect, the possible method implementations of the first aspect, and the brought beneficial effects. No repeated description is provided.

According to an eighth aspect, a computer-readable storage medium is provided. The computer storage medium stores a computer program, the computer program includes a program instruction, and when the program instruction is executed by a processor, the processor is enabled to perform the method in the second aspect and the brought beneficial effects. No repeated description is provided.

BRIEF DESCRIPTION OF THE DRAWINGS

FIG. 1(1) is a schematic structural diagram of the system architecture according to FIG. 1;

FIG. 1(2) is another schematic structural diagram of the system architecture according to FIG. 1;

FIG. 11 is a schematic block diagram of another sending device 1100 according to an embodiment of this application; and FIG. 12 is a schematic block diagram of another receiving device 1200 according to an embodiment of this application.

DETAILED DESCRIPTION OF ILLUSTRATIVE EMBODIMENTS

The following describes embodiments of this application with reference to accompanying drawings in the embodiments of this application.

Figure 1:
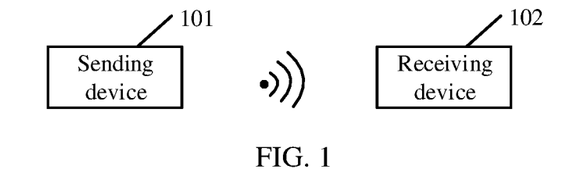
FIG. 1 is a schematic block diagram of a data transmission system architecture according to an embodiment of this application.

FIG. 1 is a schematic diagram of a data transmission system architecture according to an embodiment of this application. As shown in FIG. 1, the system architecture includes a sending device 101 and a receiving device 102, and the sending device 101 and the receiving device 102 are connected through Wi-Fi. The sending device 101 is located at a transmit end, and is configured to send data to the receiving device 102. The receiving device 102 is located at a receive end, and is configured to receive the data sent by the sending device 101.

The transmit end and the receive end may be respectively a server end and a terminal end, or the transmit end and the receive end may be respectively a terminal end and a server end. That the transmit end and the receive end are respectively a server end and a terminal end is used as an example below to describe the system architecture provided in this embodiment of this application.

Figure 11:
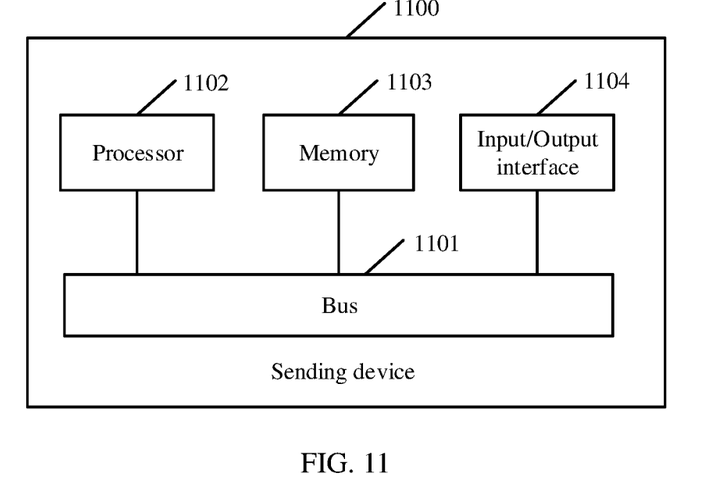

In an optional implementation, the system architecture may further include a source device (not shown in the figure) located at the transmit end. In this case, a flow direction of transmitting data is sequentially the source device, the sending device 101, and the receiving device 102. The source device, the sending device 101, and the receiving device 102 may be respectively a server, an access point (AP) device, and a terminal. The source device and the sending device 101 may be connected in a wired manner by using network devices (for example, a router and an optical line terminal (OLT)) in a plurality of hops. The server described in this embodiment of this application may be various types of servers such as a network game server. The AP device described in this embodiment of this application may be a home AP device such as an optical network terminal (ONT) or customer-premises equipment (CPE), or may be an enterprise network AP device. The terminal described in this embodiment of this application may be a terminal device such as a mobile phone (for example, an Android mobile phone or an iOS mobile phone), a tablet, a desktop computer, a mobile internet device (MID), a personal digital assistant (PDA), a set-top box (STB), or a virtual reality (VR) terminal. For ease of understanding, in FIG. 1(1), that the sending device 101 and the receiving device 102 are respectively an AP device and a mobile phone is used as an example to describe the system architecture.

The system architecture may further include one or more other AP devices located between a last-hop network device and the sending device 101. In this case, the other AP devices may be connected to the last-hop network device in a wired manner, the plurality of other AP devices may be connected through Wi-Fi, and the other AP devices may be connected to the sending device 101 through Wi-Fi.

Figure 12:
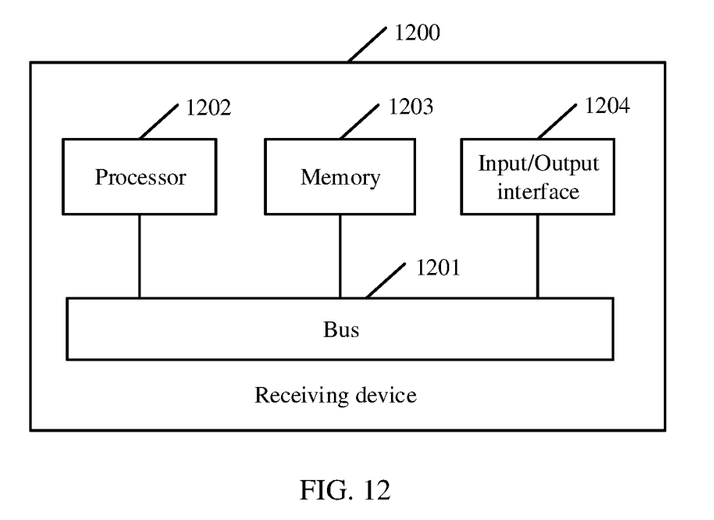

In an optional implementation, the system architecture may further include a source device (not shown in the figure) located at the transmit end and a destination device (not shown in the figure) located at the receive end. In this case, a flow direction of transmitting data is sequentially the source device, the sending device 101, the receiving device 102, and the destination device. The source device, the sending device 101, the receiving device 102, and the destination device may be respectively a server, an AP device, an AP device, and a terminal. The source device may be connected to the sending device 101 in a wired manner by using network devices in a plurality of hops, and the receiving device 102 may be connected to the destination device through Wi-Fi or in a wired manner. For ease of understanding, in FIG. 1(2), that the sending device 101 and the receiving device 102 each are an AP device is used as an example to describe the system architecture.

The system architecture may further include one or more other AP devices located between a last-hop network device and the sending device 101. In this case, the other AP devices may be connected to the last-hop network device in a wired manner, the plurality of other AP devices may be connected in a wired manner or through Wi-Fi, and the other AP devices may be connected to the sending device 101 in a wired manner or through Wi-Fi.

The system architecture may further include one or more other AP devices located between the receiving device 102 and the destination device. In this case, the other AP devices may be connected to the receiving device 102 in a wired manner or through Wi-Fi, the plurality of other AP devices may be connected in a wired manner or through Wi-Fi, and the other AP devices may be connected to the destination device in a wired manner or through Wi-Fi.

When the transmit end and the receive end are respectively a terminal end and a server end, for a specific structure of the system architecture, refer to related descriptions of the system architecture that exists when the transmit end and the receive end are respectively a server end and a terminal end.

In this embodiment of this application, both a master chip and a Wi-Fi chip are disposed in the sending device 101. The Wi-Fi chip receives a media access control (MAC) service data unit (MSDU) from the master chip.

The MSDU may be an IP (Internet Protocol) data packet transmitted by the master chip to the Wi-Fi chip, or may be a data unit that is transmitted by the master chip to the Wi-Fi chip and that is obtained after encapsulation processing is performed on the IP data packet, for example, a logical link control (LLC) protocol data unit (LPDU). The LPDU is obtained by the master chip by adding an LLC header to a header of the IP data packet.

The IP data packet is received by the master chip from another device (for example, the source device, a network device between the source device and the sending device 101, or another AP device between the source device and the sending device 101) located at the transmit end. When receiving the IP data packet, the master chip may identify whether the IP data packet is an IP data packet of a specified service. If the IP data packet is the IP data packet of the specified service, when the master chip transmits the IP data packet to the Wi-Fi chip, the master chip notifies, through parameter transmission or the like, the Wi-Fi chip that the IP data packet is the IP data packet of the specified service, or when the master chip transmits, to the Wi-Fi chip, the LPDU obtained after encapsulation processing is performed on the IP data packet, the master chip notifies, through parameter transmission or the like, the Wi-Fi chip that the LPDU is an LPDU of the specified service.

A manner in which the master chip identifies whether the IP data packet is the IP data packet of the specified service may include obtaining a source IP address from the IP data packet, and determining whether a preset source IP address set includes the obtained source IP address, and if the preset source IP address set includes the obtained source IP address, identifying the IP data packet as the IP data packet of the specified service. The preset source IP address set may be a source server IP address set obtained by the master chip by intercepting domain name system (DNS) exchange between the terminal and the server and performing domain name matching.

Further, the Wi-Fi chip performs encapsulation processing on the received MSDU, to obtain a MAC protocol data unit (MPDU). There may be two manners in which the Wi-Fi chip performs encapsulation processing on the MSDU to obtain the MPDU. (1) Encapsulation processing is performed on a single MSDU to obtain the MPDU. (2) A plurality of MSDUs are first aggregated into a longer data frame—an aggregate MAC service data unit (A-MSDU) by using an aggregate frame encapsulation format technology, and then encapsulation processing is performed on the A-MSDU to obtain the MPDU. A maximum length of the A-MSDU depends on a maximum length of the MPDU.

That the Wi-Fi chip performs encapsulation processing on the MSDU to obtain the MPDU includes: respectively adding a MAC header and a frame check sequence (FCS) to a header and a tail of the MSDU, and the adding the MAC header to the header of the MSDU further includes assigning a value to a sequence number of the MSDU. The sequence number to which a value is assigned is a sequence number of the MPDU.

Further, the Wi-Fi chip determines a target MPDU from the MPDU obtained after encapsulation processing is performed on the MSDU. The target MPDU is obtained after encapsulation processing is performed on an MSDU of the specified service (for example, the IP data packet of the specified service or the LPDU of the specified service). Specifically, the Wi-Fi chip determines, based on a notification message from the master chip, whether the MSDU in the MPDU includes the MSDU of the specified service, and if the MSDU in the MPDU includes the MSDU of the specified service, the Wi-Fi chip determines the MPDU as the target MPDU.

Further, the Wi-Fi chip obtains (or monitors) a retransmission rate $R_e$ between the sending device 101 and the receiving device 102. The retransmission rate $R_e$ is a probability that is of retransmitting the MPDU once in a unit time and that is obtained through statistics collection, and is used to determine whether to start a backup processing operation.

The retransmission rate $R_e$ may be a retransmission rate of MPDUs, of all services (including the specified service and an unspecified service), sent by the sending device 101 to the receiving device 102. In this case, the retransmission rate $R_e$ may be, for example, a ratio of a quantity that is of retransmitted MPDUs, of all the services, sent to the receiving device 102 in a unit time and that is obtained by the Wi-Fi chip through statistics collection to a quantity of all MPDUs of all the services that is obtained by the Wi-Fi chip through statistics collection.

Alternatively, the retransmission rate $R_e$ may be a retransmission rate of an MPDU, of the unspecified service, sent by the sending device 101 to the receiving device 102. In this case, the retransmission rate $R_e$ may be, for example, a ratio of a quantity that is of retransmitted MPDUs, of the unspecified service, sent to the receiving device 102 in a unit time and that is obtained by the Wi-Fi chip through statistics collection to a quantity of all MPDUs of the unspecified service that is obtained by the Wi-Fi chip through statistics collection.

If the obtained retransmission rate $R_e$ is greater than a preset retransmission threshold $R_{th}$, the Wi-Fi chip performs backup processing on the target MPDU to obtain a backup MPDU, and sends the target MPDU and the backup MPDU to the receiving device 102. A sequence number of the target MPDU is the same as a sequence number of the backup MPDU. That the Wi-Fi chip performs backup processing on the target MPDU to obtain the backup MPDU includes performing replication processing on the target MPDU to obtain the backup MPDU.

It may be understood that the Wi-Fi chip may continuously obtain (or monitor) the retransmission rate $R_e$ between the sending device 101 and the receiving device 102.

That the Wi-Fi chip performs backup processing on the target MPDU to obtain the backup MPDU may specifically include determining a quantity of backups based on the obtained retransmission rate $R_e$ and the preset retransmission threshold $R_{th}$, and performing backup processing on the target MPDU based on the determined quantity of backups to obtain the backup MPDU.

The determining, by the Wi-Fi chip, a quantity of backups based on the obtained retransmission rate $R_e$ and the preset retransmission threshold $R_{th}$ may specifically include determining N based on the retransmission rate $R_e$ and the retransmission threshold $R_{th}$, where N is a positive integer that meets a condition that the retransmission rate $R_e$ raised to the power of N−1 is greater than the retransmission threshold $R_{th}$, and the retransmission rate $R_e$ raised to the power of N is less than the retransmission threshold $R_{th}$, and determining N−1 as the quantity of backups. It may be understood that N is greater than 1.

For example, when the retransmission rate $R_e$ and the retransmission threshold $R_{th}$ are respectively 20% and 1%, because $R_e > R_{th}$, the Wi-Fi chip needs to perform backup processing on the target MPDU. When the retransmission rate $R_e$ is 20%, a probability that the MPDU is continuously retransmitted twice is 20%×20%=4%, and a probability that the MPDU is continuously retransmitted three times is 20%×20%×20%=0.8%. It is assumed that all events in which an MPDU is lost are independent of each other. If the Wi-Fi chip sends three same MPDUs to the receiving device 102, a probability that the MPDU is retransmitted once is reduced from 20% to 0.8%, and a probability that the MPDU is continuously retransmitted three times is reduced from 0.8% to 0.8%×0.8%×0.8%=0.0000512%. In other words, when the retransmission rate $R_e$ and the retransmission threshold $R_{th}$ are respectively 20% and 1%, if three same MPDUs are sent to the receiving device 102, that is, a quantity of backups is 2, a probability that the MPDU is retransmitted may be reduced to a value less than the retransmission threshold $R_{th}$.

That the Wi-Fi chip performs backup processing on the target MPDU to obtain the backup MPDU may specifically include performing backup processing on each target MPDU to obtain a backup MPDU of each target MPDU.

Alternatively, that the Wi-Fi chip performs backup processing on the target MPDU to obtain the backup MPDU may specifically include performing backup processing on all target MPDUs that are used as a whole, to obtain backup MPDUs of all the target MPDU.

That the Wi-Fi chip sends the target MPDU and the backup MPDU to the receiving device 102 may specifically include separately sending the target MPDU and the backup MPDU to the receiving device 102. Specifically, the Wi-Fi chip may perform encapsulation processing on a single MPDU (including a target MPDU, a backup MPDU, or a non-target MPDU) that needs to be sent to the receiving device 102 to obtain a physical layer convergence protocol (PLCP) protocol data unit (PPDU), and then send the PPDU to the receiving device 102. The PPDU is a basic data unit that preempts a radio physical channel. That the Wi-Fi chip performs encapsulation processing on the MPDU includes adding a physical layer preamble and a PLCP header to a header of the MPDU.

Figure 2:
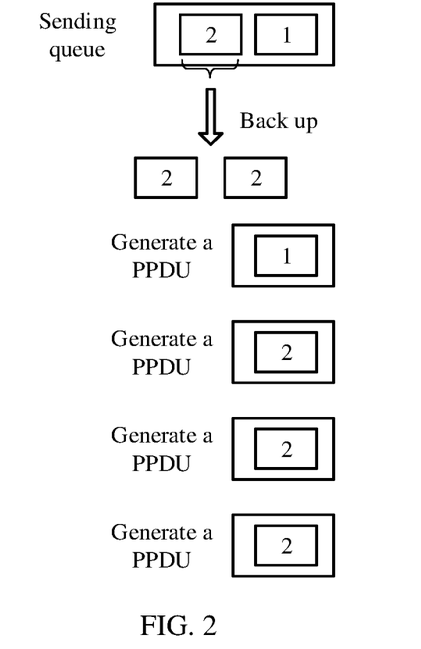
FIG. 2 is a schematic diagram of a data backup and encapsulation processing according to an embodiment of this application.

For example, when a sending queue includes MPDUs whose sequence numbers are 1 and 2, and the MPDU 2 is the target MPDU, if the quantity of backups is 2, the Wi-Fi chip generates two replications of the MPDU 2, separately performs encapsulation processing on the original MPDU 1, the original MPDU 2, and the two backup MPDUs 2 to obtain four PPDUs, and then sends the four PPDUs to the receiving device 102, as shown in FIG. 2. One sending queue includes MPDUs that are sent to a same destination device and that have a same priority.

Alternatively, that the Wi-Fi chip sends the target MPDU and the backup MPDU to the receiving device 102 may specifically include performing aggregation processing on the target MPDU and the backup MPDU, and sending, to the receiving device 102, an aggregate MAC protocol data unit (A-MPDU) obtained after aggregation processing. Specifically, the Wi-Fi chip performs encapsulation processing on the A-MPDU that needs to be sent to the receiving device 102, to obtain the PPDU, and then sends the PPDU to the receiving device 102.

That the Wi-Fi chip performs aggregation processing on the target MPDU and the backup MPDU may specifically include first sequentially performing aggregation processing on the target MPDU and the non-target MPDU in a sequence of sequence numbers to generate an aggregation queue, and then aggregating the backup MPDU with a queue tail of the aggregation queue.

When a backup is generated by performing backup processing on each target MPDU, the Wi-Fi chip may specifically aggregate the backup MPDU with the queue tail of the aggregation queue in the sequence of sequence numbers.

Figure 3:
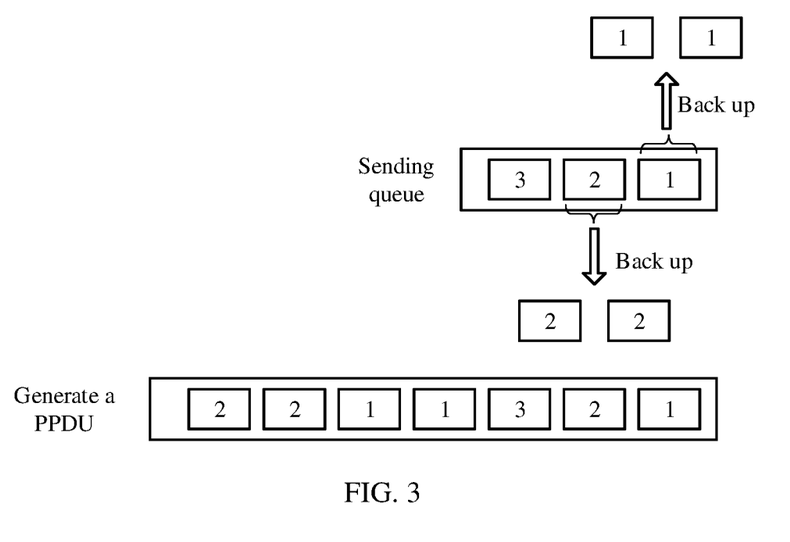
FIG. 3 is a schematic diagram of another data backup and other encapsulation processing according to an embodiment of this application.

For example, when a sending queue includes MPDUs whose sequence numbers are respectively 1, 2, and 3, and both the MPDU 1 and the MPDU 2 are target MPDUs, if the quantity of backups is 2, the Wi-Fi chip generates two replications of each of the MPDU 1 and the MPDU 2, first sequentially performs aggregation processing on the original MPDU 1, the original MPDU 2, and the original MPDU 3 in a sequence of the sequence numbers, to generate an aggregation queue, and then sequentially aggregate one backup MPDU 1, another backup MPDU 1, one backup MPDU 2, and another backup MPDU 2 with the queue tail of the aggregation queue, as shown in FIG. 3.

When a backup is generated by performing backup processing on each target MPDU, alternatively, the Wi-Fi chip may specifically perform grouping processing on backup MPDUs to obtain N groups of backup MPDUs, where N is the quantity of backups, and each group of backup MPDUs includes MPDUs with different sequence numbers, and sequentially aggregate the N groups of backup MPDUs with the queue tail of the aggregation queue.

Figure 4:
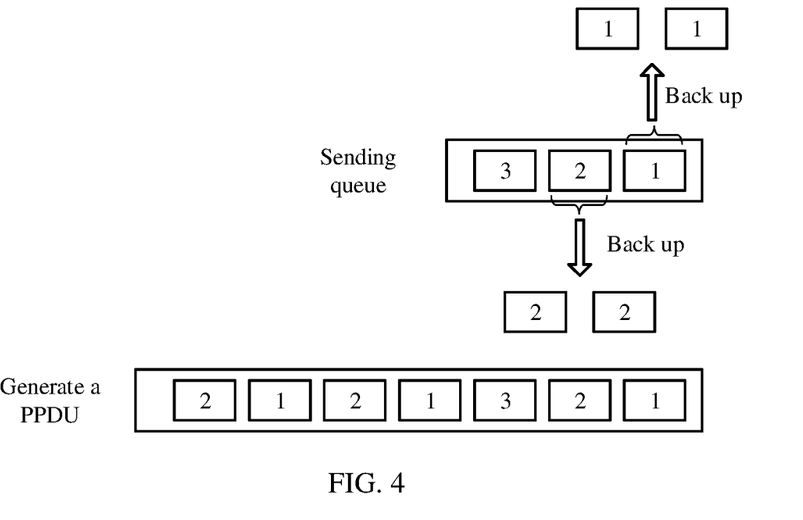
FIG. 4 is a schematic diagram of still another data backup and still other encapsulation processing according to an embodiment of this application.

For example, when a sending queue includes MPDUs whose sequence numbers are respectively 1, 2, and 3, and both the MPDU 1 and the MPDU 2 are target MPDUs, if the quantity of backups is 2, the Wi-Fi chip generates two replications of each of the MPDU 1 and the MPDU 2, first sequentially performs aggregation processing on the original MPDU 1, the original MPDU 2, and the original MPDU 3 in a sequence of the sequence numbers to generate an aggregation queue, divides backup MPDUs into two groups, where each group of back MPDUs include one backup MPDU 1 and one backup MPDU 2, and then sequentially aggregate the two groups of backup MPDUs with a queue tail of the aggregation queue, as shown in FIG. 4.

When a backup is generated by performing backup processing on all target MPDUs that are used a whole, the Wi-Fi chip may specifically aggregate each group of backup MPDUs with the queue tail of the aggregation queue.

Figure 5:
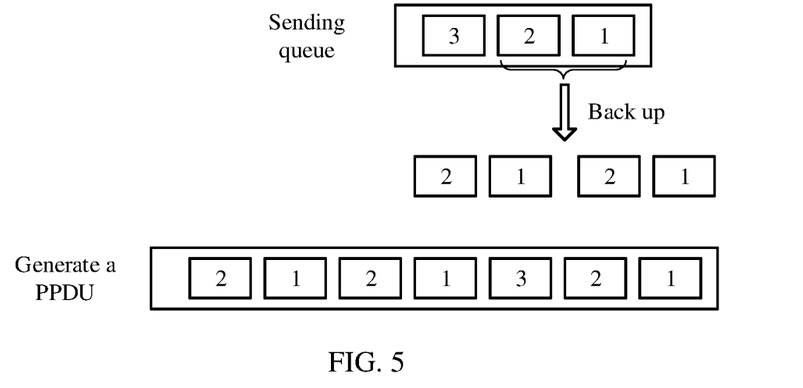
FIG. 5 is a schematic diagram of yet another data backup and yet other encapsulation processing according to an embodiment of this application.

For example, when a sending queue includes MPDUs whose sequence numbers are respectively 1, 2, and 3, and both the MPDU 1 and the MPDU 2 are target MPDUs, if the quantity of backups is 2, the Wi-Fi chip generates two replications of the MPDU 1 and the MPDU 2 that are used as a whole, first sequentially performs aggregation processing on the original MPDU 1, the original MPDU 2, and the original MPDU 3 in a sequence of the sequence numbers to generate an aggregation queue, and then sequentially aggregate the two groups of MPDUs with the queue tail of the aggregation queue, as shown in FIG. 5.

The receiving device 102 receives the PPDU, and performs decapsulation processing on the received PPDU. The performing decapsulation processing on the PPDU includes removing the physical layer preamble and the PLCP header from the PPDU. If the PPDU is obtained by performing encapsulation processing on the single MPDU, the receiving device 102 performs decapsulation processing on the PPDU to obtain the MPDU. If the PPDU is obtained by performing encapsulation processing on the A-MPDU, the receiving device 102 performs decapsulation processing on the PPDU to obtain the A-MPDU. Further, the receiving device 102 performs deaggregation processing on the A-MPDU to obtain the plurality of MPDUs.

Further, the receiving device 102 obtains a sequence number of an MPDU obtained through decapsulation processing or deaggregation processing, and determines whether an MPDU with the sequence number exists in a buffer queue. If the MPDU with the sequence number exists in the buffer queue, the receiving device 102 discards the MPDU, or if the MPDU with the sequence number does not exist in the buffer queue, the receiving device 102 further checks, based on the FCS, whether the MPDU is correct. If the MPDU is correct, the receiving device 102 places the MPDU in the buffer queue, or if the MPDU is incorrect, the receiving device 102 discards the MPDU. When it is learned, through a check based on the FCS, that the MPDU is incorrect, it indicates that an error packet exists in a process of transmitting the MPDU.

Further, the receiving device 102 receives the MPDU in the buffer queue into a local protocol stack. Specifically, the receiving device 102 sequentially uploads MPDUs with complete sequence numbers in the buffer queue to the protocol stack in a sequence of the sequence numbers, for example, uploads the MPDUs to an LLC layer of the protocol stack, and returns a block acknowledgment (BA) frame to the receiving device 102 short interframe space (SIFS) duration later after receiving the PPDU. The BA frame is used to notify the receiving device 102 of integrity of the MPDU received by the receiving device 102.

If an MPDU in the buffer queue is lack of a sequence number, in other words, there is a sequence number hole in the buffer queue, according to an order-preserving mechanism of the buffer queue, the receiving device 102 sequentially receives MPDUs with sequence numbers before the hole into the protocol stack in a sequence of the sequence numbers, and leaves an MPDU with a sequence number after the hole in a buffer waiting state. Until the sending device 101 supplements the hole by retransmitting the MPDU with the sequence number hole, the MPDU in the buffer waiting state in the buffer queue and the supplemented MPDU can be sequentially received into the protocol stack in a sequence of sequence numbers.

Regardless of whether an MPDU with a complete sequence number is received from the buffer queue, the receiving device 102 returns a BA frame to the sending device 101 SIFS duration later after receiving the PPDU. The BA frame is used to notify the sending device 101 of a sequence number of an MPDU correctly received by the receiving device 102 and a sequence number of an MPDU that needs to be retransmitted by the sending device 101.

If a plurality of retransmissions fails, and consequently, the sequence number hole in the buffer queue cannot be supplemented, or the sending device 101 does not receive the BA frame within preset timeout duration after sending the PPDU, the sending device 101 sends a block acknowledgment request (BAR) to the receiving device 102. The BAR frame is used to flush the sequence number hole in the buffer queue of the receiving device 102 and enable the receiving device 102 to return the BA frame. In the receiving device 102, all complete MPDUs whose sequence numbers are lower than a start sequence number of the BAR frame are received into the protocol stack, and all incomplete MPDUs whose sequence numbers are lower than the start sequence number of the BAR frame are discarded.

Figure 6:
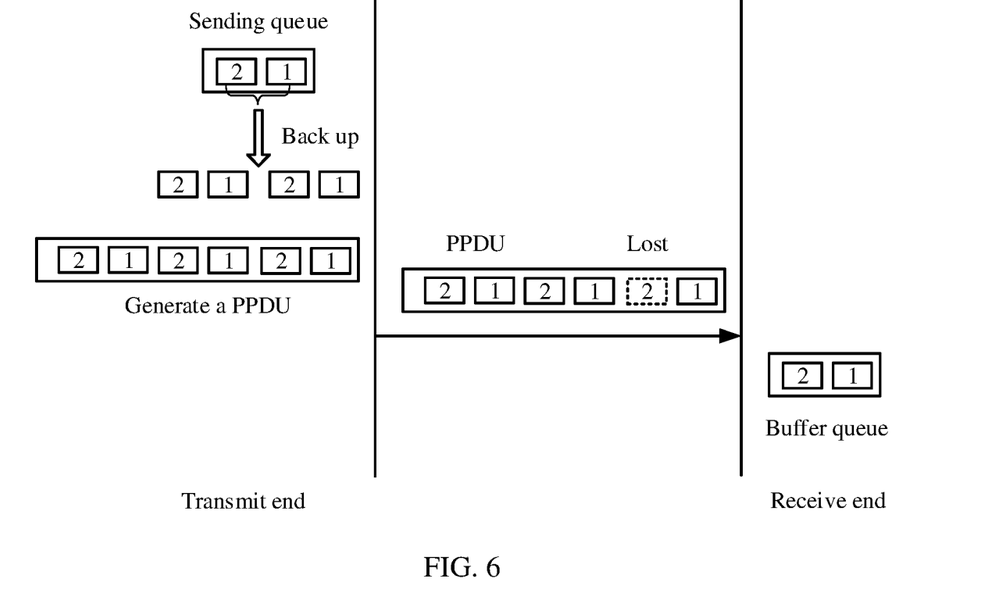
FIG. 6 is a schematic diagram of data processing and transmission according to an embodiment of this application.

For example, when a sending queue of the sending device 101 includes MPDUs whose sequence numbers are respectively 1 and 2, and both the MPDUs 1 and 2 are target MPDUs, if the quantity of backups is 2, the sending device 101 may generate two replications of the MPDUs 1 and 2 that are used as a whole. Further, as shown in FIG. 6, the sending device 101 performs aggregation processing on the target MPDUs and backup MPDUs, and performs encapsulation processing on an A-MPDU obtained through the aggregation processing, to obtain a PPDU.

The sending device 101 sends the PPDU to the receiving device 102. As shown in FIG. 6, in a sending process, one MPDU 2 is lost. Because the other two MPDUs 2 are correctly transmitted, the receiving device 102 still correctly receives the MPDU 2. In addition, the receiving device 102 discards two MPDUs 1 whose sequence numbers are the same and one MPDU whose sequence number is 2.

In this embodiment of this application, for the specified service, a probability that the target MPDU (namely, the MPDU of the specified service) is retransmitted once in the Wi-Fi phase is reduced to at least the preset retransmission threshold by sending a plurality of backups, to greatly reduce a transmission delay of the target MPDU in the Wi-Fi phase. In addition, a retransmission rate between the sending device and the receiving device is monitored in real time, and the quantity of backups of the target MPDU is dynamically adjusted based on the monitored retransmission rate. In this embodiment of this application, a single retransmission rate of the target MPDU can be dynamically ensured.

Because the delay has relatively small impact on a delay-insensitive service (that is, a service having a relatively low delay requirement) such as a bit stream (BitTorrent, BT) download, the specified service described in this embodiment of this application may be an end-to-end delay-sensitive service (that is, a service having a relatively high delay requirement) such as a mobile game service. Certainly, this embodiment of this application may also be applied to reducing a transmission delay of an MPDU of a service other than the delay-sensitive service in the Wi-Fi phase. This is not specifically limited in this embodiment of this application.

Figure 7:
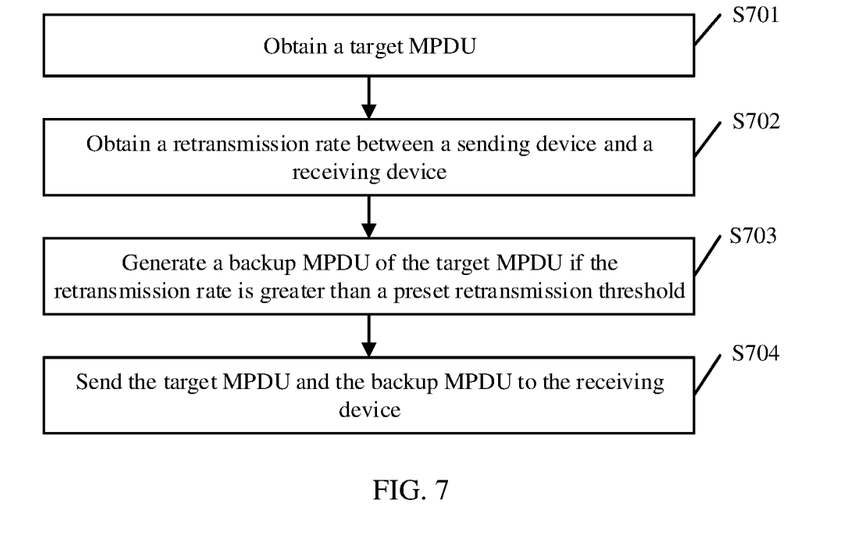
FIG. 7 is a schematic flowchart of a data sending method according to an embodiment of this application.

FIG. 7 is a schematic flowchart of a data sending method according to an embodiment of this application. The data sending method may be specifically applied to a sending device, and a Wi-Fi chip is disposed in the sending device. As shown in FIG. 7, the data sending method includes the following steps.

S701. Obtain a target MPDU.

Specifically, the Wi-Fi chip disposed in the sending device receives, from a master chip, an MSDU that needs to be sent to a receiving device, and then performs encapsulation processing on the received MSDU to obtain an MPDU. The MPDU obtained through the encapsulation processing is a to-be-sent MPDU. It can be learned that the sending device and the receiving device are separately located at a transmit end and a receive end. The sending device and the receiving device are connected through Wi-Fi. That the Wi-Fi chip performs encapsulation processing on the MSDU includes assigning a value to a sequence number of the MSDU, where the sequence number to which the value is assigned is a sequence number of the MPDU.

When sending the MSDU to the Wi-Fi chip, the master chip notifies, through parameter transmission or the like, the Wi-Fi chip whether the MSDU is an MSDU of a specified service. Therefore, the Wi-Fi chip may determine, based on a notification message from the master chip, whether the MPDU obtained through encapsulation processing includes the MSDU of the specified service, and if the MPDU obtained through encapsulation processing includes the MSDU of the specified service, the Wi-Fi chip may determine the MPDU as the target MPDU.

The MSDU may be an IP data packet transmitted by the master chip to the Wi-Fi chip, or may be a data unit such as an LPDU that is transmitted by the master chip to the Wi-Fi chip and that is obtained after encapsulation processing is performed on the IP data packet.

The IP data packet is received by the master chip from another device located at the transmit end. When receiving the IP data packet, the master chip may identify whether the IP data packet is an IP data packet of the specified service. If the IP data packet is the IP data packet of the specified service, when the master chip transmits the IP data packet to the Wi-Fi chip, the master chip notifies, through parameter transmission or the like, the Wi-Fi chip that the IP data packet is the IP data packet of the specified service, or when the master chip transmits the LPDU to the Wi-Fi chip, the master chip notifies, through parameter transmission or the like, the Wi-Fi chip that the LPDU is an LPDU of the specified service.

A manner in which the master chip identifies whether the IP data packet is the IP data packet of the specified service may include obtaining a source IP address from the IP data packet, and determining whether a preset source IP address set includes the obtained source IP address, and if the preset source IP address set includes the obtained source IP address, identifying the IP data packet as the IP data packet of the specified service. The preset source IP address set may be a source server IP address set obtained by the master chip by intercepting DNS exchange between a terminal and a server and performing domain name matching.

Usually, the master chip is also disposed in the sending device. In this case, operations such as receiving the IP data packet, identifying whether the IP data packet is the IP data packet of the specified service, and sending the IP data packet or the LPDU used as the MSDU to the Wi-Fi chip are all performed by the sending device. In other words, the Wi-Fi chip of the sending device receives the MSDU from the master chip of the sending device.

In this embodiment of this application, the sending device may be an AP device (for example, a home AP device or an enterprise network AP device).

S702. Obtain a retransmission rate between the sending device and the receiving device.

The retransmission rate $R_e$ a probability that is of retransmitting the MPDU once in a unit time and that is obtained through statistics collection, and is used to determine whether to start a backup processing operation on the target MPDU.

In an optional implementation, the retransmission rate $R_e$ may be a retransmission rate of MPDUs, of all services (including the specified service and an unspecified service), sent by the sending device to the receiving device. In this case, the retransmission rate $R_e$ may be, for example, a ratio of a quantity that is of retransmitted MPDUs, of all the services, sent to the receiving device in a unit time and that is obtained by the Wi-Fi chip through statistics collection to a quantity of all MPDUs of all the services that is obtained by the Wi-Fi chip through statistics collection.

In another optional implementation, the retransmission rate $R_e$ may alternatively be a retransmission rate of an MPDU, of an unspecified service, sent by the sending device to the receiving device. In this case, the retransmission rate $R_e$ may be, for example, a ratio of a quantity that is of retransmitted MPDUs, of the unspecified service, sent to the receiving device in a unit time and that is obtained by the Wi-Fi chip through statistics collection to a quantity of all MPDUs of the unspecified service that is obtained by the Wi-Fi chip through statistics collection.

It may be understood that the Wi-Fi chip may continuously obtain (or monitor) the retransmission rate $R_e$ between the sending device and the receiving device.

S703. Generate a backup MPDU of the target MPDU if the retransmission rate is greater than a preset retransmission threshold.

A sequence number of the target MPDU is the same as a sequence number of the backup MPDU. That the Wi-Fi chip generates the backup MPDU of the target MPDU includes performing replication processing on the target MPDU to obtain the backup MPDU.

That the Wi-Fi chip generates the backup MPDU of the target MPDU may specifically include determining a quantity of backups based on the obtained retransmission rate $R_e$ and the preset retransmission threshold $R_{th}$, and performing replication processing on the target MPDU based on the determined quantity of backups to obtain the backup MPDU. The quantity of backups is a positive integer.

That the Wi-Fi chip determines the quantity of backups based on the obtained retransmission rate $R_e$ and the preset retransmission threshold $R_{th}$ may specifically include determining N based on the retransmission rate and the retransmission threshold, and determining the quantity of backups based on N, where N is a positive integer greater than 1. N meets a condition that the retransmission rate raised to the power of N−1 is greater than the retransmission threshold, and the retransmission rate raised to the power of N is less than the retransmission threshold.

That the Wi-Fi chip determines the quantity of backups based on N may specifically include determining N−1 as the quantity of backups. When the quantity of backups is N−1, a probability that the MPDU is retransmitted may just be reduced to a value less than the retransmission threshold $R_{th}$. Certainly, the quantity of backups may alternatively be greater than N−1. In this case, a probability that the MPDU is retransmitted is lower, but more traffic bandwidth is consumed.

In an optional implementation, that the Wi-Fi chip generates the backup MPDU of the target MPDU may specifically include performing backup processing on each target MPDU to obtain a backup MPDU of each target MPDU.

In another optional implementation, that the Wi-Fi chip generates the backup MPDU of the target MPDU may specifically include performing backup processing on all target MPDUs that are used as a whole, to obtain backup MPDUs of all the target MPDU.

S704. Send the target MPDU and the backup MPDU to the receiving device.

In an optional implementation, that the Wi-Fi chip sends the target MPDU and the backup MPDU to the receiving device may specifically include separately sending the target MPDU and the backup MPDU to the receiving device.

In this case, the Wi-Fi chip may perform encapsulation processing on a single MPDU (including the target MPDU, the backup MPDU, or a non-target MPDU) that needs to be sent to the receiving device, to obtain a PPDU, and then send the PPDU to the receiving device.

In another optional implementation, that the Wi-Fi chip sends the target MPDU and the backup MPDU to the receiving device may specifically include performing aggregation processing on the target MPDU and the backup MPDU, and sending, to the receiving device, the target MPDU and the backup MPDU that are aggregated.

That the Wi-Fi chip performs aggregation processing on the target MPDU and the backup MPDU may specifically include first sequentially performing aggregation processing on the target MPDU and the non-target MPDU in a sequence of sequence numbers to generate an aggregation queue, and then aggregating the backup MPDU with a queue tail of the aggregation queue.

When a backup is generated by performing backup processing on each target MPDU, the Wi-Fi chip may specifically aggregate the backup MPDU with the queue tail of the aggregation queue in the sequence of sequence numbers.

When a backup is generated by performing backup processing on each target MPDU, alternatively, the Wi-Fi chip may specifically perform grouping processing on backup MPDUs to obtain N groups of backup MPDUs, where N is the quantity of backups, and each group of backup MPDUs includes MPDUs with different sequence numbers, and sequentially aggregate the N groups of backup MPDUs with the queue tail of the aggregation queue.

When a backup is generated by performing backup processing on all target MPDUs that are used a whole, the Wi-Fi chip may specifically aggregate each group of backup MPDUs with the queue tail of the aggregation queue In this embodiment of this application, for the specified service, a probability that the target MPDU (namely, the MPDU of the specified service) is retransmitted once is reduced to at least the preset retransmission threshold by sending a plurality of backups, to greatly reduce a transmission delay of the target MPDU in a Wi-Fi phase. In addition, a retransmission rate between the sending device and the receiving device is monitored in real time, and the quantity of backups of the target MPDU is dynamically adjusted based on the monitored retransmission rate. In this embodiment of this application, a single retransmission rate of the target MPDU can be dynamically ensured.

Figure 8:
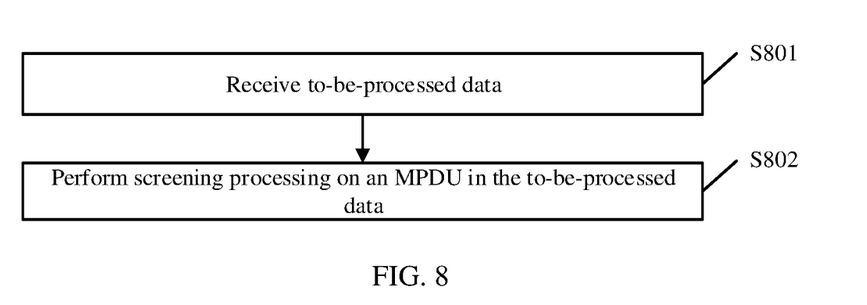
FIG. 8 is a schematic flowchart of a data receiving method according to an embodiment of this application.

FIG. 8 is a schematic flowchart of a data receiving method according to an embodiment of this application. The data receiving method may be specifically applied to a receiving device. As shown in FIG. 8, the data receiving method includes the following steps.

S801. Receive to-be-processed data.

The to-be-processed data includes an MPDU, and a sequence number is set for the MPDU. In this embodiment of this application, the to-be-processed data may be a PPDU.

Specifically, the receiving device receives the to-be-processed data from a sending device. It can be learned that the sending device and the receiving device are separately located at a transmit end and a receive end. The receiving device and the sending device are connected through Wi-Fi.

S802. Perform screening processing on the MPDU in the to-be-processed data.

When the to-be-processed data is the PPDU, before the receiving device performs screening processing on the MPDU in the to-be-processed data, the receiving device may further perform decapsulation processing on the received PPDU. If the PPDU is obtained by performing encapsulation processing on a single MPDU, the receiving device performs decapsulation processing on the PPDU to obtain the MPDU. If the PPDU is obtained by performing encapsulation processing on an A-MPDU, the receiving device performs decapsulation processing on the PPDU to obtain the A-MPDU. Further, the receiving device performs deaggregation processing on the A-MPDU to obtain a plurality of MPDUs.

The screening processing includes performing deduplication processing on the MPDU based on the sequence number. Specifically, the receiving device obtains a sequence number of an MPDU obtained through decapsulation processing or deaggregation processing, and determines whether an MPDU with the sequence number exists in a buffer queue. If the MPDU with the sequence number exists in the buffer queue, the receiving device discards the MPDU, or if the MPDU with the sequence number does not exist in the buffer queue, the receiving device places the MPDU in the buffer queue.

Further, the receiving device may receive the MPDU in the buffer queue into a local protocol stack.

In this embodiment of this application, screening processing is performed on the received MPDU, so that the receive end can be prevented from repeatedly storing same data, to save storage space.

Figure 9:
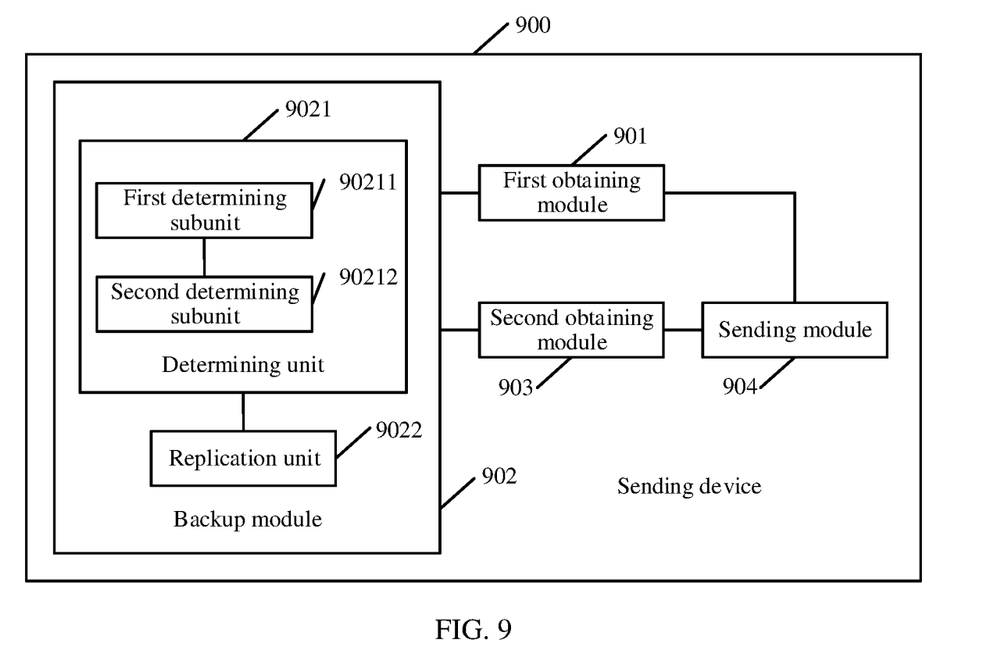
FIG. 9 is a schematic block diagram of a sending device 900 according to an embodiment of this application.

FIG. 9 is a schematic block diagram of a sending device 900 according to an embodiment of this application. In this embodiment of this application, the sending device 900 and the receiving device are connected through Wi-Fi. As shown in FIG. 9, the sending device 900 may include a first obtaining module 901, a backup module 902, a second obtaining module 903, and a sending module 904.

The first obtaining module 901 is configured to obtain a target medium access control protocol data unit (MPDU).

The target MPDU is obtained by performing encapsulation processing on an IP data packet of a specified service.

In an optional implementation, the first obtaining module 901 is specifically configured to obtain a to-be-sent MPDU, where the to-be-sent MPDU is obtained by performing encapsulation processing on a medium access control service data unit MSDU, and if the to-be-sent MPDU includes a target MSDU, identify the to-be-sent MPDU as the target MPDU.

In this embodiment of this application, the target MSDU is the IP data packet of the specified service, or the target MSDU is obtained by performing encapsulation processing on the IP data packet of the specified service.

In an optional implementation, the IP data packet of the specified service is identified after a source IP address of the IP data packet of the specified service is matched against a preset IP address set.

The backup module 902 is configured to generate a backup MPDU of the target MPDU.

The second obtaining module 903 is configured to obtain a retransmission rate between the sending device and the receiving device. The backup module 902 is specifically configured to generate the backup MPDU of the target MPDU if the retransmission rate is greater than a preset retransmission threshold.

In an optional implementation, the retransmission rate is determined based on a quantity of retransmitted MPDUs sent to the receiving device in a unit time and a total quantity of MPDUs sent to the receiving device in the unit time that are obtained through statistics collection.

MPDUs sent by the sending device to the receiving device may include an MPDU of the specified service and an MPDU of an unspecified service. In another optional implementation, the retransmission rate is determined based on a quantity of retransmitted MPDUs of the unspecified service that are sent to the receiving device in a unit time and a total quantity of MPDUs of the unspecified service that are sent to the receiving device in the unit time that are obtained through statistics collection.

In this embodiment of this application, the backup module 902 may include a determining unit 9021 and a replication unit 9022.

The determining unit 9021 is configured to determine a quantity of backups based on the retransmission rate and the retransmission threshold. The quantity of backups is a positive integer.

The replication unit 9022 is configured to perform replication processing on the target MPDU based on the quantity of backups, to generate the backup MPDU.

In this embodiment of this application, the determining unit 9021 may include a first determining subunit 90211 and a second determining subunit 90212.

The first determining subunit 90211 is configured to determine N based on the retransmission rate and the retransmission threshold. Herein, N is a positive integer greater than 1, and N meets a condition that the retransmission rate raised to the power of N−1 is greater than the retransmission threshold, and the retransmission rate raised to the power of N is less than the retransmission threshold.

The second determining subunit 90212 is configured to determine the quantity of backups based on N.

In this embodiment of this application, the second determining subunit 90212 is specifically configured to determine N−1 as the quantity of backups.

The sending module 904 is configured to send the target MPDU and the backup MPDU to the receiving device.

In an optional implementation, the sending module 904 is specifically configured to separately send the target MPDU and the backup MPDU to the receiving device.

In another optional implementation, the sending module 904 is specifically configured to perform aggregation processing on the target MPDU and the backup MPDU, and send, to the receiving device, the target MPDU and the backup MPDU that are aggregated.

In this embodiment of this application, a sequence number is set for the to-be-sent MPDU obtained after encapsulation processing, and the target MPDU and the backup MPDU of the target MPDU have a same sequence number.

In an optional implementation, the aggregation processing includes separately performing aggregation processing on the target MPDU and the backup MPDU sequentially based on the sequence number.

In an optional implementation, the aggregation processing includes performing aggregation processing on the target MPDU and the backup MPDU sequentially based on the sequence number.

Based on a same inventive concept, a problem-resolving principle and beneficial effects of the sending device 900 provided in this embodiment of this application are similar to those of the data sending method embodiment of this application. Therefore, for implementation of the sending device 900, refer to the implementation of the data sending method shown in FIG. 7. No repeated description is provided.

Figure 10:
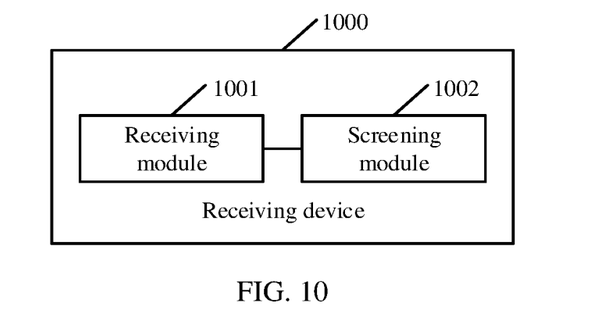
FIG. 10 is a schematic block diagram of a receiving device 1000 according to an embodiment of this application.

FIG. 10 is a schematic block diagram of a receiving device 1000 according to an embodiment of this application. As shown in FIG. 10, the receiving device 1000 may include a receiving module 1001 and a screening module 1002.

The receiving module 1001 is configured to receive to-be-processed data. The to-be-processed data includes a medium access control protocol data unit (MPDU), and a sequence number is set for the MPDU.

The screening module 1002 is configured to perform screening processing on the MPDU. The screening processing includes performing deduplication processing on the MPDU based on the sequence number.

Based on a same inventive concept, a problem-resolving principle and beneficial effects of the receiving device 1000 provided in this embodiment of this application are similar to those of the data receiving method embodiment of this application. Therefore, for implementation of the receiving device moo, refer to the implementation of the data receiving method shown in FIG. 8. No repeated description is provided.

FIG. 11 is a schematic block diagram of another sending device 1100 according to an embodiment of this application. In this embodiment of this application, the sending device 1100 and a receiving device are connected through Wi-Fi. As shown in FIG. 11, the sending device 1100 may include a bus 1101, a processor 1102, a memory 1103, and an input/output interface 1104. The bus 1101 is configured to connect the processor 1102, the memory 1103, and the input/output interface 1104 to each other, so that the foregoing elements can communicate with each other. The memory 1103 is configured to store one or more computer programs, and the computer program includes a program instruction. The input/output interface 1104 is configured to control a communication connection between the sending device 1100 and another device. For example, the sending device 1100 may communicate with the receiving device through the input/output interface 1104.

Specifically, the processor 1102 is configured to invoke the program instruction to perform the following operations obtaining a target medium access control protocol data unit (MPDU), where the target MPDU is obtained by performing encapsulation processing on an IP data packet of a specified service, generating a backup MPDU of the target MPDU, and sending the target MPDU and the backup MPDU to the receiving device.

In an optional implementation, when the processor 1102 is configured to invoke the program instruction to obtain the target medium access control protocol data unit (MPDU), the processor 1102 specifically performs the following operations obtaining a to-be-sent MPDU, where the to-be-sent MPDU is obtained by performing encapsulation processing on a medium access control service data unit MSDU, and if the to-be-sent MPDU includes a target MSDU, identifying the to-be-sent MPDU as the target MPDU, where the target MSDU is the IP data packet of the specified service, or the target MSDU is obtained by performing encapsulation processing on the IP data packet of the specified service.

In an optional implementation, the IP data packet of the specified service is identified after a source IP address of the IP data packet of the specified service is matched against a preset IP address set.

In an optional implementation, before the processor 1102 is configured to invoke the program instruction to generate the backup MPDU of the target MPDU, the processor 1102 further performs the following operations obtaining a retransmission rate between the sending device and the receiving device; and if the retransmission rate is greater than a preset retransmission threshold, triggering execution of the generating a backup MPDU of the target MPDU.

In an optional implementation, the retransmission rate is determined based on a quantity of retransmitted MPDUs sent to the receiving device in a unit time and a total quantity of MPDUs sent to the receiving device in the unit time that are obtained through statistics collection.

MPDUs sent by the sending device to the receiving device may include an MPDU of the specified service and an MPDU of an unspecified service. In another optional implementation, the retransmission rate is determined based on a quantity of retransmitted MPDUs of the unspecified service that are sent to the receiving device in a unit time and a total quantity of MPDUs of the unspecified service that are sent to the receiving device in the unit time that are obtained through statistics collection.

In an optional implementation, when the processor 1102 is configured to invoke the program instruction to generate the backup MPDU of the target MPDU, the processor 1102 specifically performs the following operations determining a quantity of backups based on the retransmission rate and the retransmission threshold, where the quantity of backups is a positive integer; and performing replication processing on the target MPDU based on the quantity of backups, to generate the backup MPDU.

In an optional implementation, when the processor 1102 is configured to invoke the program instruction to determine the quantity of backups based on the retransmission rate and the retransmission threshold, the processor 1102 specifically performs the following operations determining N based on the retransmission rate and the retransmission threshold, where N is a positive integer greater than 1; and determining the quantity of backups based on N, where N meets a condition that the retransmission rate raised to the power of N−1 is greater than the retransmission threshold, and the retransmission rate raised to the power of N is less than the retransmission threshold.

In an optional implementation, when the processor 1102 is configured to invoke the program instruction to determine the quantity of backups based on N, the processor 1102 specifically performs the following operation of determining N−1 as the quantity of backups.

In an optional implementation, when the processor 1102 is configured to invoke the program instruction to send the target MPDU and the backup MPDU to the receiving device, the processor 1102 specifically performs the following operation of separately send the target MPDU and the backup MPDU to the receiving device.

In another optional implementation, when the processor 1102 is configured to invoke the program instruction to send the target MPDU and the backup MPDU to the receiving device, the processor 1102 specifically performs the following operations, including performing aggregation processing on the target MPDU and the backup MPDU; and sending, to the receiving device, the target MPDU and the backup MPDU that are aggregated.

In this embodiment of this application, a sequence number may be set for the to-be-sent MPDU obtained after encapsulation processing, and the target MPDU and the backup MPDU of the target MPDU have a same sequence number.

In an optional implementation, the aggregation processing includes separately performing aggregation processing on the target MPDU and the backup MPDU sequentially based on the sequence number.

In another optional implementation, the aggregation processing includes performing aggregation processing on the target MPDU and the backup MPDU sequentially based on the sequence number.

The processor 1102 may be a central processing unit (CPU). The memory 1103 may be any type of memory, for example, may be a read-only memory (ROM), a random access memory (RAM), a nonvolatile random access memory, or the like.

Based on a same inventive concept, a problem-resolving principle and beneficial effects of the sending device 1100 provided in this embodiment of this application are similar to those of the data sending method embodiment of this application. Therefore, for implementation of the sending device 1100, refer to the implementation of the data sending method shown in FIG. 7. No repeated description is provided.

FIG. 12 is a schematic block diagram of another receiving device 1200 according to an embodiment of this application. As shown in FIG. 12, the receiving device 1200 may include a bus 1201, a processor 1202, a memory 1203, and an input/output interface 1204. The bus 1201 is configured to connect the processor 1202, the memory 1203, and the input/output interface 1204 to each other, so that the foregoing elements can communicate with each other. The memory 1203 is configured to store one or more computer programs, and the computer program includes a program instruction. The input/output interface 1204 is configured to control a communication connection between the sending device 1200 and another device.

Specifically, the processor 1202 is configured to invoke the program instruction to perform the following operations, including receiving to-be-processed data, where the to-be-processed data includes a medium access control protocol data unit (MPDU), and a sequence number is set for the MPDU; and performing screening processing on the MPDU, where the screening processing includes performing deduplication processing on the MPDU based on the sequence number.

The processor 1202 may be a CPU. The memory 1202 may be any type of memory, for example, may be a ROM, a RAM, a nonvolatile random access memory, or the like.

Based on a same inventive concept, a problem-resolving principle and beneficial effects of the receiving device 1200 provided in this embodiment of this application are similar to those of the data receiving method embodiment of this application. Therefore, for implementation of the receiving device 1200, refer to the implementation of the data receiving method shown in FIG. 8. No repeated description is provided.

A person of ordinary skill in the art may understand that all or some processes of the methods in the embodiments may be implemented by a computer program instructing related hardware. The program may be stored in a computer-readable storage medium. When the program is run, the processes of the methods in the embodiments are performed. The foregoing storage medium may be a magnetic disk, an optical disk, a ROM, or a RAM.

What is claimed is:

1. A data sending method, comprising:
   obtaining, by a sending device, a target medium access control protocol data unit (MPDU) by performing encapsulation processing on an internet protocol (IP) data packet of a specified service, wherein the sending device and a receiving device are connected through Wi-Fi;
   obtaining a retransmission rate between the sending device and the receiving device, the retransmission rate being greater than a preset retransmission threshold;
   generating, in response to the retransmission rate being greater than the preset retransmission threshold, a backup MPDU of the target MPDU; and
   sending, prior to any retransmission of the target MPDU to the receiving device, the target MPDU and the backup MPDU to the receiving device.

2. The method according to claim 1, wherein obtaining the target MPDU comprises:
   obtaining a to-be-sent MPDU by performing encapsulation processing on a medium access control service data unit (MSDU); and
   identifying the to-be-sent MPDU as the target MPDU in response to the to-be-sent MPDU comprising a target MSDU, wherein the target MSDU is the IP data packet of the specified service.

3. The method according to claim 1, wherein the IP data packet of the specified service is identified after a source IP address of the IP data packet of the specified service is matched against a preset IP address set.

4. The method according to claim 1, wherein the retransmission rate is determined according to a quantity of retransmitted MPDUs sent to the receiving device in a unit time and a total quantity of MPDUs sent to the receiving device in the unit time that are obtained through statistics collection.

5. The method according to claim 1, wherein:
   MPDUs sent by the sending device to the receiving device comprise a first MPDU of the specified service and a second MPDU of an unspecified service; and
   the retransmission rate is determined based on a quantity of retransmitted MPDUs of the unspecified service that are sent to the receiving device in a unit time and a total quantity of MPDUs of the unspecified service that are sent to the receiving device in the unit time that are obtained through statistics collection.

6. The method according to claim 1, wherein the generating the backup MPDU of the target MPDU comprises:
   determining a quantity of backups according to the retransmission rate and the retransmission threshold, wherein the quantity of backups is a positive integer; and
   generating the backup MPDU by performing replication processing on the target MPDU according to the quantity of backups.

7. The method according to claim 6, wherein determining the quantity of backups based on the retransmission rate and the retransmission threshold comprises:
   determining N based on the retransmission rate and the retransmission threshold, wherein N is a positive integer greater than 1; and
   determining the quantity of backups according to N, wherein the retransmission rate raised to the power of N−1 is greater than the retransmission threshold, and wherein the retransmission rate raised to the power of N is less than the retransmission threshold.

8. The method according to claim 7, wherein determining the quantity of backups according to N comprises determining N−1 as the quantity of backups.

9. The method according to claim 1, wherein sending the target MPDU and the backup MPDU to the receiving device comprises:
    sending the target MPDU to the receiving device separately from sending the backup MPDU to the receiving device.

10. The method according to claim 1, wherein sending the target MPDU and the backup MPDU to the receiving device comprises:
    generating an aggregated element by performing aggregation processing on the target MPDU and the backup MPDU; and
    sending, to the receiving device, the target MPDU and the backup MPDU as the aggregated element.

11. The method according to claim 10, wherein performing the aggregation processing comprises:
    performing the aggregation processing on multiple non-backup MPDUs, wherein the multiple non-backup MPDUs comprise the target MPDU; and
    putting the backup MPDU after the multiple non-backup MPDUs.

12. The method according to claim 11, wherein the multiple non-backup MPDUs further comprise an MPDU of an unspecified service.

13. The method according to claim 12, wherein a sequence number is associated with each to-be-sent MPDU obtained after encapsulation processing, and
    wherein the performing the aggregation processing comprises sorting the multiple non-backup MPDUs according to sequence numbers associated with the multiple non-backup MPDUs.

14. The method according to claim 13, wherein performing the aggregation processing comprises:
    performing aggregation processing on multiple target MPDUs, wherein, for each target MPDU of the multiple target MPDUs, the respective target MPDU and the backup MPDU of the respective target MPDU have a same sequence number; and
    sorting multiple backup MPDUs of the multiple target MPDUs according to sequence numbers associated with the multiple backup MPDUs.

15. The data sending method of claim 1, further comprising:
    monitoring the retransmission rate in real time;
    dynamically adjusting a quantity of backups of the target MPDU based on the retransmission rate as monitored.

16. A sending device, comprising:
    a processor; and
    a non-transitory computer-readable storage medium storing a program to be executed by the processor, the program including instructions for:
        obtaining a target medium access control protocol data unit (MPDU) by performing encapsulation processing on an internet protocol (IP) data packet of a specified service, wherein the sending device and a receiving device are connected through Wi-Fi;
        obtaining a retransmission rate between the sending device and the receiving device;
        generating, in response to the retransmission rate being greater than a preset retransmission threshold, a backup MPDU of the target MPDU; and
        sending, prior to any retransmission of the target MPDU to the receiving device, the target MPDU and the backup MPDU to the receiving device.

17. The sending device according to claim 16, wherein the instructions for obtaining the target MPDU include instructions for:
    obtaining a to-be-sent MPDU by performing encapsulation processing on a medium access control service data unit (MSDU); and
    identifying the to-be-sent MPDU as the target MPDU in response to the to-be-sent MPDU comprising a target MSDU, wherein the target MSDU is the IP data packet of the specified service.

18. The sending device according to claim 16, wherein the IP data packet of the specified service is identified after a source IP address of the IP data packet of the specified service is matched against a preset IP address set.

19. A receiving device, wherein the receiving device comprises:
    a processor; and
    a non-transitory computer-readable storage medium storing a program to be executed by the processor, the program including instructions for:
        receiving to-be-processed data, wherein the to-be-processed data comprises a target medium access control protocol data unit (MPDU) and a backup MPDU, the target MPDU and the backup MPDU having been transmitted by a sending device prior to any retransmission of the target MPDU by the sending device and in response to a retransmission rate between the sending device and the receiving device being greater than a preset retransmission threshold, and wherein a sequence number is associated with the target MPDU and the backup MPDU; and
        performing deduplication processing on the target MPDU and the backup MPDU according to the sequence number.

20. The receiving device of claim 19, wherein:
    the to-be-processed data, as received, comprises a physical layer convergence protocol (PLCP) protocol data unit (PPDU), the PPDU comprising an aggregate MPDU (A-MPDU) that comprises the target MPDU and the backup MPDU; and
    the program further includes instructions for:
        performing decapsulation processing on the PPDU to obtain the A-MPDU; and
        performing deaggregation processing on the A-MPDU to obtain the target MPDU and the backup MPDU.

* * * * *